UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

ARSENOPHENOL.

No. 909,389.

Specification of Letters Patent.

Patented Jan. 12, 1909.

Application filed May 1, 1908. Serial No. 430,389.

*To all whom it may concern:*

Be it known that we, PAUL EHRLICH, M. D., professor of medicine, and ALFRED BERTHEIM, Ph. D., both citizens of the Empire of Germany, and residing at Frankfort-on-the-Main, Germany, have invented certain new and useful Improvements in Arsenophenols, of which the following is a specification.

We have found that the hitherto unknown arsenophenols, the constitution of which corresponds to the formula:

$$HO-Aryl-As=As-Aryl-OH$$

and which can be prepared by reducing the hydroxyarylarsinic acids, are valuable for medical purposes.

The reaction which leads to the new compounds may be explained by the equation:

$$2\text{-Aryl (OH) AsO}_3H_2 + 8H = HO\ Aryl\ As=As\ Aryl\ OH + 6H_2O.$$

The arsenophenols are powders of reddish-brown color, insoluble in water and benzene, but soluble in alcohol and acetone with a yellow color. They are also dissolved by alkalies forming then yellow salts. The sodium salts thus produced can be separated from a concentrated solution by means of alcohol and form, when dried, yellow powders which are readily soluble in water and more difficultly soluble in alcohol. The arsenophenols, if injected in the form of the sodium salts into animals suffering from infectious disease caused by trypanosomas, are capable of curing them.

As already mentioned, the arsenophenols are obtained from hydroxyarylarsinic acids by reduction, i. e. by the action of strong reducing agents. The hydroxyarylarsinic acids are produced from the corresponding aminoarylarsinic acids by means of the diazo-compounds. By the action of weak reducing agents on the hydroxyarylarsinic acids, hydroxyarylarsenoxids are produced which, on being further reduced, are also transformed into the arsenophenols.

The preparation of the arsenophenols is carried out for instance in the following manner: 217 parts by weight of para-aminophenylarsinic acid are dissolved in 18 times its quantity of water, 200 parts by weight of concentrated pure sulfuric acid are added, and diazotization is effected by allowing to flow into the mixture a solution of 74 parts by weight of sodium nitrite. The thus-formed diazo-solution is heated until no further nitrogen evolves. The sulfuric acid is then removed from the solution by precipitation with barium hydroxid and the residual liquid is filtered and evaporated *in vacuo*. The sodium salt of the hydroxyphenylarsinic acid is thus obtained and can be produced in a pure state as a slightly yellowish substance by crystallization from dilute alcohol. An aqueous solution of 10 parts by weight of this sodium salt is added to a solution of 50 parts by weight of sodium hydrosulfite free from water of crystallization, which has been neutralized by addition of 25 parts by weight of crystallized magnesium chlorid and 20 parts by weight of 30% caustic soda lye and then filtered. This mixture is heated for about one hour on the water bath. The reddish-brown precipitate of arsenophenol thus formed is filtered and washed with water. When dry, the arsenophenol is a reddish-brown powder, insoluble in water and benzene but soluble in alcohol and acetone. In caustic soda lye it dissolves readily with a yellow color and forms a sodium salt which is precipitated by alcohol from concentrated solution. This sodium arsenophenolate, a yellow powder, is readily soluble in water, more difficultly soluble in alcohol.

Very similar to the arsenophenol are the homologous compounds which can be prepared by a similar process from the analogous hydroxyarylarsinic acids; as for instance hydroxytolylarsinic acid $$C_6H_3CH_3.OH AsO_3H_2(CH_3:OH:AsO_3H_2=1:2:5);$$

hydroxyxylylarsinic acid $$C_6H_2(CH_3)_2.OH,AsO_3H_2(CH_3:CH_3:OH:AsO_3H_2=1:4:2:5).$$

Having now described our invention, what we claim is:

1. As new products, the arsenophenols, the constitution of which corresponds to the formula:

$$HO-Aryl-As=As-Aryl-OH$$

being reddish-brown powders, insoluble in water and benzene but soluble in alcohol, acetone and ether, and which are also soluble in caustic soda lye and then form yellow colored sodium salts which are readily soluble in water but more difficultly soluble in alcohol.

2. As a new product, the arsenophenol, the constitution of which corresponds to the formula:

$$HO-C_6H_4-As=As-C_6H_4-OH$$

a reddish-brown powder, which is insoluble in water and benzene but readily soluble in alcohol, acetone and ether, and which dissolves in caustic soda lye with a yellow color thus forming a sodium salt which is readily soluble in water and more difficultly soluble in alcohol.

In testimony, that we claim the foregoing as our invention, have signed our names in presence of two subscribing witnesses.

PAUL EHRLICH.
ALFRED BERTHEIM.

Witnesses:
  JEAN GRUND,
  CARL GRUND.